United States Patent [19]
DeLuca

[11] 3,900,305
[45] Aug. 19, 1975

[54] METHOD OF FORMING CONDUCTIVE LAYER ON OXIDE-CONTAINING SURFACES

[75] Inventor: Robert D. DeLuca, Big Flats, N.Y.

[73] Assignee: Corning Glass Works, Corning, N.Y.

[22] Filed: May 7, 1973

[21] Appl. No.: 358,013

[52] U.S. Cl. .................... 65/30; 117/107; 117/118; 117/123 B; 117/124 C; 117/229; 65/32; 427/101; 427/124

[51] Int. Cl. .............................................. C23c 13/04

[58] Field of Search ........ 117/222, 107, 118, 123 B, 117/124 C, 229

[56] References Cited

UNITED STATES PATENTS

| | | | |
|---|---|---|---|
| 2,104,073 | 1/1938 | Druyvesteyn et al. | 117/107 |
| 3,012,902 | 12/1961 | Bayer | 117/107 X |
| 3,241,934 | 3/1966 | Granitsas et al. | 65/4 X |
| 3,253,331 | 5/1966 | Limansky | 117/124 C |
| 3,331,670 | 7/1967 | Cole | 65/4 |
| 3,472,688 | 10/1969 | Hayashi et al. | 117/222 |

*Primary Examiner*—Mayer Weinblatt
*Attorney, Agent, or Firm*—William J. Simmons, Jr.; Walter S. Zebrowski; Clarence R. Patty, Jr.

[57] ABSTRACT

Disclosed is a method of forming a conductive layer on an oxide-containing ceramic substrate. The substrate is disposed in an essentially oxygen-free atmosphere and is heated to a temperature greater than 300°C. but less than the softening or deforming point of the substrate. The surface of the heated substrate is subjected to magnesium vapor, and the resultant reaction reduces the substrate surface and forms a conductive cermet layer thereon. This method can be used to form conductive layers and paths in such devices as resistors, channel amplifier arrays, multilead arrays, cathode ray tubes, and the like.

16 Claims, 10 Drawing Figures

METHOD OF FORMING CONDUCTIVE LAYER ON OXIDE-CONTAINING SURFACES

CROSS-REFERENCES TO RELATED APPLICATIONS

This application is related to U.S. patent applications Ser. No. 358,014 entitled "Encapsulated Impedance Element and Method" and Ser. No. 358,070 entitled "Insulated Cermet Resistor and Method of Forming" both filed on even date herewith, now U.S. Pat. Nos. 3,810,068 and 3,808,574, respectively.

BACKGROUND OF THE INVENTION

This invention relates to a method of forming MgO containing conductive cermet layers on oxide-containing ceramic substrates. The term oxide-containing ceramic substrate includes substrates of other materials which have been provided with a surface layer or coating of an oxide-containing ceramic material. This invention further relates to devices resulting from this method.

As used herein the term oxide-containing ceramic material means an inorganic, oxide-containing substance in the crystalline or amorphous state which can be formed by sintering or melting. Sinterable ceramics, glasses and glass-ceramics are included within this definition. By sinterable ceramic material is meant an inorganic substance in the crystalline or amorphous state which can be compacted or agglomerated by heating to a temperature near, but below the temperature at which it melts or has low enough viscosity to deform. By glass is meant an inorganic product of fusion which is formed into a final shape and then cooled to a rigid condition without crystallizing. By glass-ceramics is meant those glasses containing nucleating agents which can be formed and cooled as glasses and later crystallized to fine-grained glass-ceramics by appropriate heat treatment. Although glass is the intermediate material, the final material is essentially crystalline.

The formation of conductive layers on oxide-containing ceramic surfaces has heretofore been accomplished primarily by applying a layer of conductive material thereto. Methods such as evaporation and sputtering are well suited for the coating of flat surfaces, and chemical vapor deposition has been used to form conductive layers on complicated surfaces. Glasses containing easily reduced oxides such as PbO have been reduced in hydrogen to form conductive surfaces. This latter method has been successfully utilized to form resistive films on the inner surfaces of glass tubes and to form secondary electron-emitting layers on the tubular surfaces of glass channel amplifier arrays. Although electrically conductive surfaces have been formed by hydrogen reduction of certain glasses, the electrical resistivity and other properties of such conductive surfaces are limited due to the limited number of materials that can be reduced in this manner.

SUMMARY OF THE INVENTION

Briefly, the method of the present invention may be used to form a conductive layer on an oxide-containing ceramic surface. The surface is disposed in an essentially oxygen-free atmosphere and is heated to a temperature that is greater than 300°C. but less than that which would adversely affect the surface. The surface is then subjected to magnesium vapor which reduces the surface and forms a conductive cermet layer thereon.

DETAILED DESCRIPTION

Figure 1:
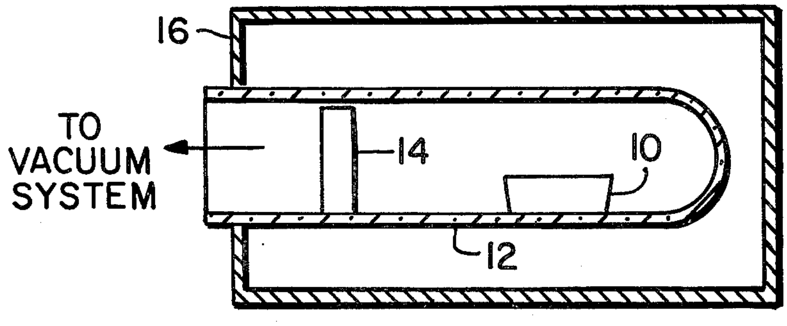
FIGS. 1 and 2 are schematic illustrations of apparatus which may be used to form a conductive layer in accordance with the method of the present invention.

In the temperature range 0°–1,000°C., magnesium is second only to calcium in reducing power, as measured by its heat of formation. Moreover, the vapor pressure is sufficiently high for magnesium to sublime at 400°C., and at 600°C. it has a very high vapor pressure, i.e., about 5 mm Hg. Because of its strong reducing power, magnesium can reduce even pure silica, an oxide that is normally considered to be difficult to reduce. Many oxide-containing ceramic substrates have been subjected to magnesium vapor at elevated temperatures in accordance with the method of the present invention. All investigated oxide-containing ceramic materials were reducible by magnesium, and conductive cermet layers could be formed on the surfaces thereof by the present method.

The reduction of such oxide-containing ceramic materials by magnesium forms a conductive cermet in which magnesium oxide is the ceramic constituent, the remainder of the cermet comprising magnesium, magnesium intermetallic compounds and the metallic constituents of the oxides present in the oxide-containing ceramic material. For example, when $SiO_2$ is reduced by magnesium, the resulting cermet can contain MgO, Mg, $Mg_2Si$ and Si. The intermetallic compounds and metallic phases are usually electrically conductive, and the relative amounts of insulating phases, including MgO, and conducting phases determine the electrical resistivity of the resulting cermet. The composition and resistivity of the cermet layer can be controlled by controlling the amount of magnesium used, the temperature and time of reaction and the composition of the oxide-containing ceramic material. The fact that glass, glass-ceramic and sinterable ceramic materials can be made containing virtually any metal oxides makes possible the creation of a very large number of magnesium cermets with a correspondingly wide variety of electrical, optical and thermal properties.

The two aforementioned related patent applications teach a method of making electrical connections between an impedance element and its external leads and a method of forming an electrical resistor, both methods pertaining to the reduction of oxide-containing materials by magnesium in hermetically sealed chambers. In both of these applications some of the magnesium vapor reacts with oxygen in a chamber of limited dimensions to form MgO and to reduce the pressure therein, the remainder of said vapor reducing the chamber forming surfaces and forming a conductive cermet layer thereon.

The present method relates to the reaction of magnesium vapor and an oxide-containing ceramic material in a furnace tube or other reaction chamber, the dimensions of which are considerably greater than those of the aforementioned related applications. This method must therefore be performed in an essentially oxygen-free atmosphere to prevent the dissipation of magnesium vapor by oxygen which would normally be present in the reaction chamber. By essentially oxygen-free atmosphere is meant one in which the oxygen pressure is less than 0.1 mm Hg. A reaction chamber can be provided with such an atmosphere by evacuating the chamber to a pressure of $10^{-4}$ Torr or less or by flushing the chamber with an inert gas. If the reaction is to be carried out in an evacuated chamber, the preferred pressure is $10^{-6}$ Torr or less. Any other method that would exclude oxygen from the substrate surface could be employed. For example, the chamber could be provided with more magnesium vapor than that necessary for reducing the substrate surface, the excess vapor reacting with oxygen in the chamber. Also, a getter powder could be packed in the chamber. If oxygen is not removed from the reaction chamber, it will react with the magnesium vapor therein and prevent reduction of the oxide containing ceramic material or substantially reduce the amount of magnesium vapor available for that reaction.

The reaction chamber can be provided with magnesium vapor by disposing a heated source of metallic magnesium in the reaction chamber or by disposing a heated source of magnesium remote from the chamber and causing the magnesium vapor therefrom to flow into the chamber with or without inert carrier gas. If a carrier gas is used, it can also flush oxygen from the chamber and thereby reduce the oxygen pressure therein. The vapor pressure of the magnesium vapor in the reaction chamber should generally be one hundred times the oxygen pressure if the chamber is evacuated or one hundred times the total pressure in the chamber if the chamber is flushed with an inert gas. The minimum temperature to which the magnesium source should be heated to achieve the required vapor pressure is 400°C. If the magnesium source is disposed outside the reaction chamber, the walls of the tube connecting the source of the chamber should also be heated to at least 400°C. to prevent the condensation of vapor thereon.

An oxide-containing ceramic substrate must be heated to at least 300°C. before magnesium vapor will react with the surface thereof. For the reaction to proceed at a reasonable rate, substrates containing the more easily reduced oxides such as oxides of lead, cadmium, zinc, germanium, tin, antimony and the like should be heated to about 450°C. Substrates containing oxides that are more difficult to reduce such as oxides of calcium, silicon, aluminum and the like should be heated to at least 600°C. to obtain reasonable reaction rates.

The resistivity of the cermet layer is a function of the vapor pressure of the magnesium vapor, substrate composition, and temperature and time of reaction. The thickness of the cermet layer also depends upon the reaction time and vapor pressure of magnesium. The required resistivity and thickness of a particular film depends upon the ultimate use thereof. If a conductive layer is to be formed on the channel forming surfaces of a multichanneled plate, for example, the thickness of the film should be on the order of 0.1–0.5 $\mu$ and the film surface should be relatively smooth. The thickness of the conductive film on the inner surface of a television funnel could be on the order of 1–10 $\mu$ and the surface could be relatively rough. Other devices may require still other thicknesses.

Referring to FIG. 1, a magnesium containing alumina boat 10 is disposed inside a reaction chamber such as fused silica tube 12 which also contains an oxide-containing ceramic substrate 14 on which a conductive cermet layer is to be formed. The magnesium source may be a solid cast piece or it may be in the form of ribbon or powder, the former being preferred. That portion of tube 12 containing boat 10 and substrate 14 is disposed in furnace 16, which is preferably of the type wherein the temperature of the substrate and that of the magnesium source can be separately controlled. Tube 12 can be evacuated by connecting a vacuum system to the open end thereof.

Figure 2:
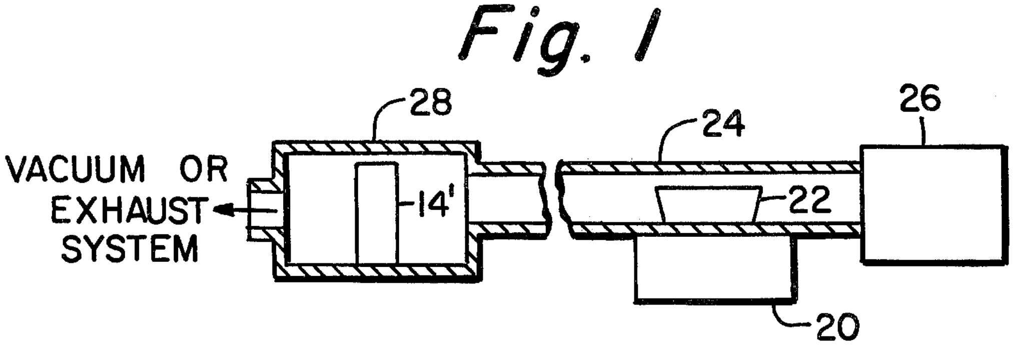

As shown in FIG. 2, the source of magnesium vapor may be remotely disposed with respect to the reaction chamber. Heating means 20 increases the temperature of magnesium containing boat 22 to at least 400°C., thereby generating magnesium vapor which is carried to a heated reaction chamber 28. Tube 24 must also be heated to at least 400°C. to prevent the condensation of magnesium vapor thereon. Chamber 28 may be connected to a vacuum or exhaust system. In this embodiment oxygen can be removed from chamber 28 by operating the vacuum system, or it can be purged from chamber 28 by passing therethrough the inert carrier gas from source 26.

The following examples are illustrative of the innumerable variety of oxygen-containing ceramic substrate materials that can be provided with a conductive layer in accordance with the method of the present invention.

EXAMPLE 1

The system shown in FIG. 1 was utilized to form a conductive cermet on a photosensitive alkali zinc glass-ceramic substrate. The substrate was supported vertically in the tube 12 a few inches away from magnesium containing boat 10. The system was closed and evacuated to $10^{-7}$ Torr. The furnace was heated to 400°C. and held for 16 hours. Thereafter, the temperature was raised to 600°C. for 1 hour, and the furnace was then turned off. The location of substrate 14 was such that when the furnace was heated to 600°C., the substrate temperature was about 500°C., whereas the temperature of the magnesium source was about 600°C. After the furnace had cooled to room temperature, that surface of substrate 14 which faced the magnesium containing boat 10 was found to have reacted with the magnesium vapor to form a blue-gray conductive surface having a resistivity of about 140 ohms per square.

EXAMPLE 2

A three inch long ribbon of a lead silicate glass was placed in a furnace of the type shown in FIG. 1, the location of the ribbon being such that the temperature of one portion thereof was 500°C. The temperature of the magnesium source was about 600°C. After a 100 minute heat treatment at these temperatures in a $10^{-7}$ Torr vacuum, the furnace was turned off and the system was allowed to cool. The glass ribbon had a silver-colored, low resistance coating thereon, that portion thereof which was at 500°C. exhibiting a resistivity of 360 ohms per square.

EXAMPLE 3

To investigate the effect of temperature upon cermet composition a ribbon sample of lead silicate glass was so disposed in the furnace that it was subjected to a large temperature gradient, the ribbon temperature varying from 140°C. to 560°C. The process was similar to that of Example 2 except that the sample was reacted with magnesium vapor for only 30 minutes. The reaction which occured at temperatures between 300° and 330°C. resulted in the formation of $Mg_2Pb$, $Mg_2Si$ and MgO. That portion of the ribbon which reacted with magnesium vapor at a temperature between 330°C. and 440°C. formed Pb, MgO, $Mg_2Si$ and Si. Where the reaction temperature was between 500°C., the resultant cermet contained Pb, MgO and Si. At temperatures under 300°C. magnesium metal was deposited on the glass surface from the vapor produced by heating the magnesium source, but the magnesium did not react with the glass.

EXAMPLE 4

A sinterable ceramic substrate of hydrous aluminum silicate ($Al_2O_3.2SiO_2.nH_2O$) was disposed in a reaction chamber of the type illustrated in FIG. 1 which was evacuated to $10^{-7}$ Torr. Both the substrate and magnesium source were heated to about 600°C., and the substrate was subjected to magnesium vapor for 1 hour. The resistivity of the resultant film was 50 ohms per square.

EXAMPLES 5–19

The compositions of Table 1, calculated from their batches on the oxide basis in parts by weight, are examples of oxide-containing ceramic materials from which substrates were formed. Each substrate was disposed in a reaction chamber of the type illustrated in FIG. 1 and the pressure therein was reduced to about $10^{-7}$ Torr. Both the substrate and the magnesium source were heated to the temperature indicated in Table 2, which also indicates the reaction time. The resistivity of the resultant film is also listed. Some compositions were used in more than one example, and composition B was used to form some glass substrates and some glass-ceramic substrates.

TABLE 1

| | A | B | C | D | E | F |
|---|---|---|---|---|---|---|
| $SiO_2$ | 61.41 | 79.79 | 79.8 | 76.23 | 69.0 | 58.25 |
| $Na_2O$ | 12.70 | 1.5 | 4.1 | 3.82 | 0.4 | — |
| $Al_2O_3$ | 16.82 | 3.9 | 1.9 | 2.08 | 17.8 | 4.70 |
| $B_2O_3$ | — | — | 14.2 | 14.75 | — | — |
| PbO | — | — | — | — | — | 20.40 |
| $K_2O$ | 3.64 | 4.0 | — | 1.97 | 0.7 | 8.70 |
| MgO | 3.67 | — | — | — | 2.8 | 2.95 |
| $Li_2O$ | — | 9.4 | — | — | 2.5 | — |
| ZnO | — | 1.0 | — | — | 1.0 | — |
| CaO | 0.24 | — | — | — | — | 4.25 |
| $TiO_2$ | 0.77 | — | — | — | 4.8 | — |
| $As_2O_3$ | 0.75 | — | — | — | 1.0 | 0.2 |
| BaO | — | — | — | — | — | 0.2 |
| $Sb_2O_3$ | — | 0.4 | — | 0.4 | — | 0.15 |
| $CeO_2$ | — | 0.01 | — | — | — | — |
| $U_3O_8$ | — | — | — | 0.75 | — | — |
| SrO | — | — | — | — | — | 0.1 |
| F | — | — | — | — | — | 0.1 |

TABLE 2

| Example | Substrate Composition | Temperature (degrees C.) | Reaction Time (min.) | Resistivity (ohms/square) |
|---|---|---|---|---|
| 5 | A | 500 | 50 | $7 \times 10^5$ |
| 6 | A | 560 | 50 | $7 \times 10^5$ |
| 7 | A | 600 | 50 | $1.9 \times 10^5$ |
| 8 | B | 500 | 50 | $1.2 \times 10^6$ |
| 9 | B | 560 | 50 | $2.9 \times 10^4$ |
| 10 | B | 600 | 50 | 140 |
| 11 | B* | 350 | 120 | $2.4 \times 10^8$ |
| 12 | B* | 440 | 120 | $5 \times 10^7$ |
| 13 | B* | 500 | 120 | $5.4 \times 10^7$ |
| 14 | C | 540 | 120 | $10^{10}$ |
| 15 | D | 600 | 240 | 880 |
| 16 | E | 600 | 60 | $10^4$ |
| 17 | F | 600 | 60 | $2 \times 10^5$ |
| 18 | F | 570 | 60 | $7 \times 10^5$ |
| 19 | F | 535 | 60 | $10^7$ |

*Substrate was formed from glass of composition B of Table 1 and then heat treated to convert to glass-ceramic; remainder of compositions in table are glasses.

The method of the present invention is useful for forming conductive layers or surfaces on insulating substrates or members which are used in channel amplifier arrays, cathode ray tube funnels, resistors, multilead arrays and the like. Methods of forming some of these devices will be described hereinbelow, methods of forming resistors being taught in the aforementioned related patent applications.

Figure 3:
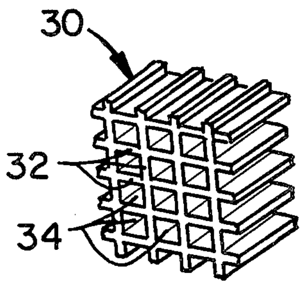
FIG. 3 is a fragmentary oblique view of a multi-channeled plate.

Channel amplifiers are usually made by a redraw technique whereby glass tubes or fibers are fused in side-by-side relation with each other. The redrawing, restacking and fusing of the resultant multitubes or multifibers is continued until a boule of desired dimensions is obtained. Discs or plates are then sliced from the boule, and both faces thereof are polished. If glass fibers are used in this process the core glass is selected to be much more susceptible to etching than the cladding glass so that the fiber cores can be removed by disposing the multifiber plate in an etching solution. Etching is not required if glass tubes are utilized to directly form a multichanneled plate in accordance with the teachings of U.S. Pat. No. 3,331,670 issued to H. B. Cole. Both of the aforementioned methods result in a multichanneled plate such as that illustrated in FIG. 3. In this figure plate 30 is formed of a multiplicity of glass tubes fused together in side-by-side relation to provide walls 32 the surfaces of which form channels 34.

For this structure to function as a channel amplifier array walls 32 must be given special properties rendering them capable of producing enhanced secondary electron emission. The channel walls have therefore usually been provided with a coating of a material such as cesium, or they have been subjected to a hydrogen reduction process to provide the desired secondary electron emission and conductive characteristics. When the hydrogen reduction process was used, the glass from which the multichanneled plate was formed had to be one which was easily reduced by hydrogen. However, even when relatively easily reducible lead glasses were utilized, the conductivity of the secondary electron emitting surface formed by hydrogen reduction was often lower than desired.

Figure 4:
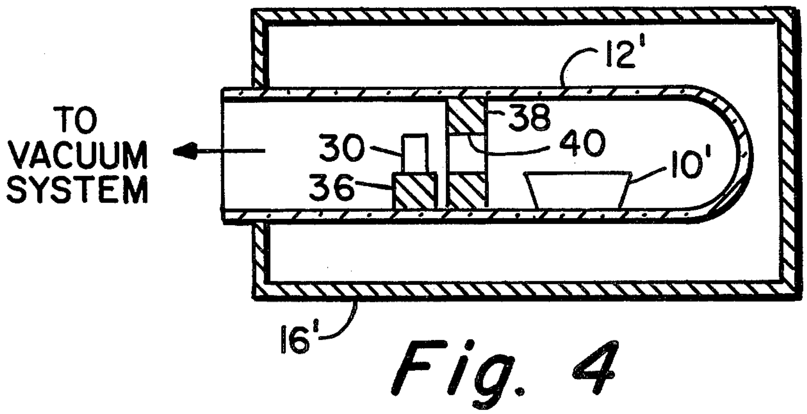
FIG. 4 is a modification of the apparatus of FIG. 1 which is useful for forming channel amplifier arrays.

In accordance with the present invention an apparatus such as that illustrated in FIG. 4 can be used to form conductive, secondary electron emissive layers on the channel forming walls 32 of multichanneled plate 30. Elements in this figure which are similar to those of FIG. 1 are represented by primed reference numerals. Magnesium containing alumina boat 10' is disposed in the closed end of fused silica tube 12'. Multichanneled glass plate 30, which is disposed upon support means 36, is also situated within tube 12', one end of which is connected to a vacuum system. Tube 12' is so disposed in a furnace 16' that the temperatures of boat 10' and plate 30 are independently controllable. A stainless steel baffle 38 having an aperture 40 extending therethrough is disposed in tube 12' between boat 10' and plate 30. Plate 30 is so disposed with respect to aperture 40 that most of the magnesium vapors emanating from the source within boat 10' pass through that aperture and are directed onto plate 30.

In order to compare the results of the present method with those obtained by hydrogen reduction, a microchanneled plate formed from a lead silicate glass was employed. The following glass composition, which was used in forming the microchanneled plate, is set forth as calculated from the glass batch in weight percent on the oxide basis: 38.5% $SiO_2$, 53% PbO, 3.5% $K_2O$, 3.5% $Al_2O_3$, 1% $Bi_2O_3$, and 0.5% $Sb_2O_3$.

Figure 5:
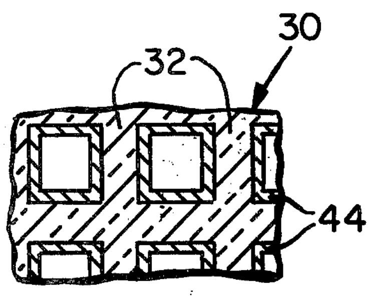
FIG. 5 is a cross-sectional view of a channel amplifier array.

Tube 12' was disposed in a furnace which subjected plate 30 to a temperature of about 450°C., the temperature of boat 10' being 600°C. The pressure within tube 12' was reduced to about $10^{-6}$ Torr. A number of similar microchanneled plates of the type described hereinabove were provided with conductive, secondary electron emissive layers by subjecting them to the aforementioned conditions for times ranging from 1 hour to 16 hours, thereby providing channel forming surfaces of walls 32 with conductive cermet layers 44 as shown in FIG. 5. The resistivities of these conductive cermet layers were between 10 and 100 ohms per square. These resistivities are at least three orders of magnitude lower than the lowest achieved by hydrogen reduction of plates made from the same glass. Channel amplifier arrays formed in accordance with the method of the present invention are also advantageous in that they are not contaminated by water from the hydrogen utilized in conventional reduction processes.

Figure 6:
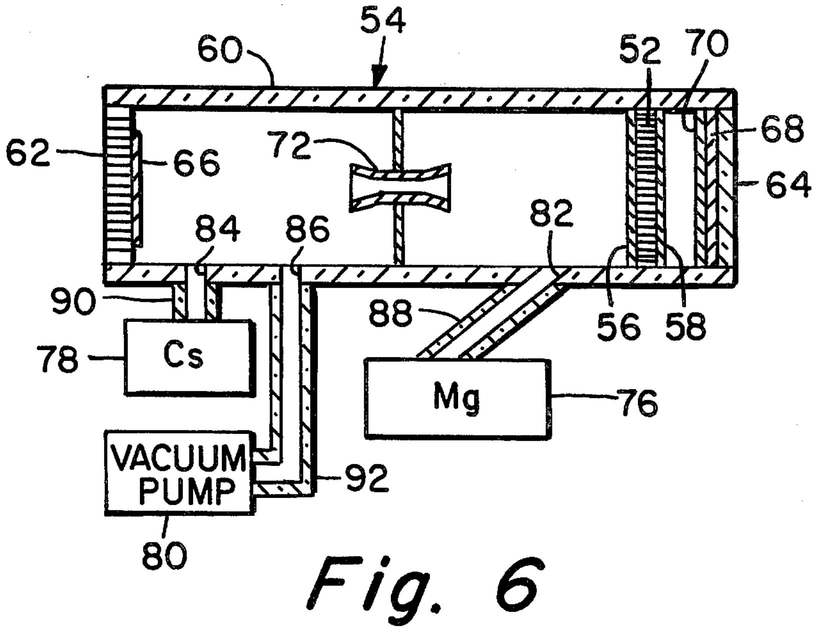
FIG. 6 is a schematic illustration of an apparatus for activating in situ a channel amplifier array.

Since metallic films such as nichrome and aluminum have been found to be unaffected by magnesium vapor, it is possible to place a microchanneled plate having nichrome electrodes into a device and activate the microchanneled plate in situ with magnesium vapor. This would prevent exposure of the microchanneled plate to air which is a major source of outgassing. An apparatus for the in situ activation of a microchanneled plate is illustrated in FIG. 6 wherein an unactivated microchanneled plate 52 is disposed in an image intensifier tube 54. Nichrome electrodes 56 and 58 can be deposited on the end faces of microchanneled plate 52 in any well known manner so that the channels are not obstructed. Image intensifier 54 also includes an envelope 60 to which are sealed an input fiber optic plate 62 and an output screen 64. A photocathode base film 66 of any well known material such as antimony may be disposed upon the inner surface of fiber optic plate 62. Output screen 64 may consist of cathodoluminescent glass or it may consist of a transparent glass plate having a layer of phosphor 68 disposed thereon. A thin film 70 of aluminum is disposed upon the surface of phosphor layer 68. Electrostatic lens 72 is disposed in the central portion of tube 54. A magnesium vapor source 76, a cesium vapor source 78 and a vacuum pump 80 are connected to openings 82, 84 and 86, respectively, in envelope 60 by glass tubes 88, 90 and 92, respectively.

That end of tube 54 containing microchanneled plate 52 is disposed in a furnace so that the temperature of the plate reaches about 400°C. while the pressure in tube 54 is maintained at $10^{-7}$ Torr. The magnesium source is periodically heated to about 500°C. to generate sufficient vapor to reduce the channel forming surfaces of plate 52. The periodic heating permits adjustment of the resistance across the resulting channel amplifier array to a value which is optimum for good gain performance, i.e., about $10^8$ ohms. Opening 82 is disposed near plate 52, and the axis of tube 88 is preferably inclined in such a manner that magnesium vapor emanating therefrom flows toward plate 52. By directing the flow of magnesium vapor and maintaining the opposite end of tube 54 at a temperature lower than that needed for cermet formation, the resultant conductive cermet layer will be substantially confined to the channel forming surfaces of the microchanneled plate. The magnesium vapor does not contaminate photocathode base film 66 since the temperature thereof is much lower than that required for the formation of a cermet and since electrostatic lens 72 traps magnesium vapor migrating toward film 66. Since phosphor layer 70 is electroded with aluminum, it will not be affected by magnesium vapor.

After microchanneled plate 52 is activated to form a channel amplifier array, cesium source 98 is fired while that side of the tube 54 containing photocathode base film 66 is disposed within a furnace which increases the temperature thereof to a value between 100°C. and 300°C., and the pressure in tube 54 is reduced to less than $10^{-9}$ Torr. The cesium source can be periodically activated and the operation of the photocathode periodically checked until satisfactory cathode response is obtained. Cesium source 78 could be replaced by other well known photocathode activating materials such as sodium, potassium and the like. After the channel amplifier array and photocathode are activated, glass tubes 88, 90 and 92 are removed from envelope 60 by a flame sealing process which hermetically seals envelope 60.

A method presently being used to form multilead arrays consists of redrawing a wire of a conductive material such as tungsten, stainless steel or the like inside glass tubing followed by stacking and fusing of the clad wires into a boule from which thin multilead arrays are sliced. A method of this type is taught in U.S. Pat. No. 3,241,934 issued to G. A. Granitsas et al. In those applications wherein a multilead array is to form a part of the envelope of a vacuum tube device, the array must be hermetic. The source of much of the leakage in a multilead array is the interface between the wire and glass.

Figure 7:
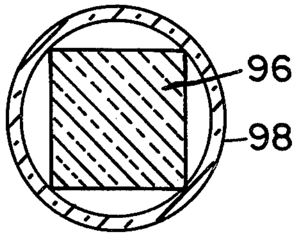
FIGS. 7, 8 and 9 illustrate steps in the formation of a multilead array.
Figure 8:
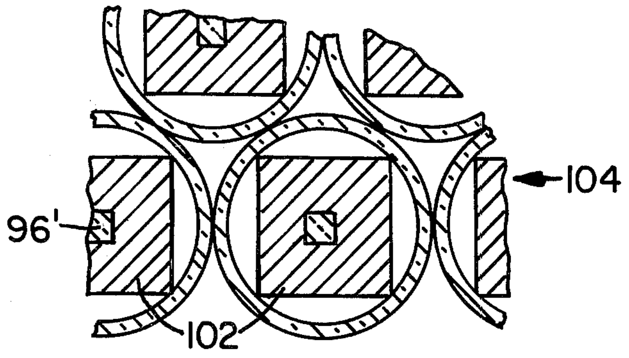

The method of the present invention can be utilized in the formation of a multilead array in the following manner. As shown in FIG. 7, square rods 96 of easily reduced glass such as a lead silicate glass are inserted into tubes 98 of soft glass such as soda lime glass that is not as easily reduced as the lead silicate glass. The resultant structures are stacked as shown in FIG. 8 and are then inserted into a furnace such as that illustrated in FIG. 1. The outer portions of rods 96 are thereby reduced by magnesium vapor and provided with a conductive cermet layer 102 surrounding the remaining portion 96′ of the original rods 96.

Figures 9, 10:
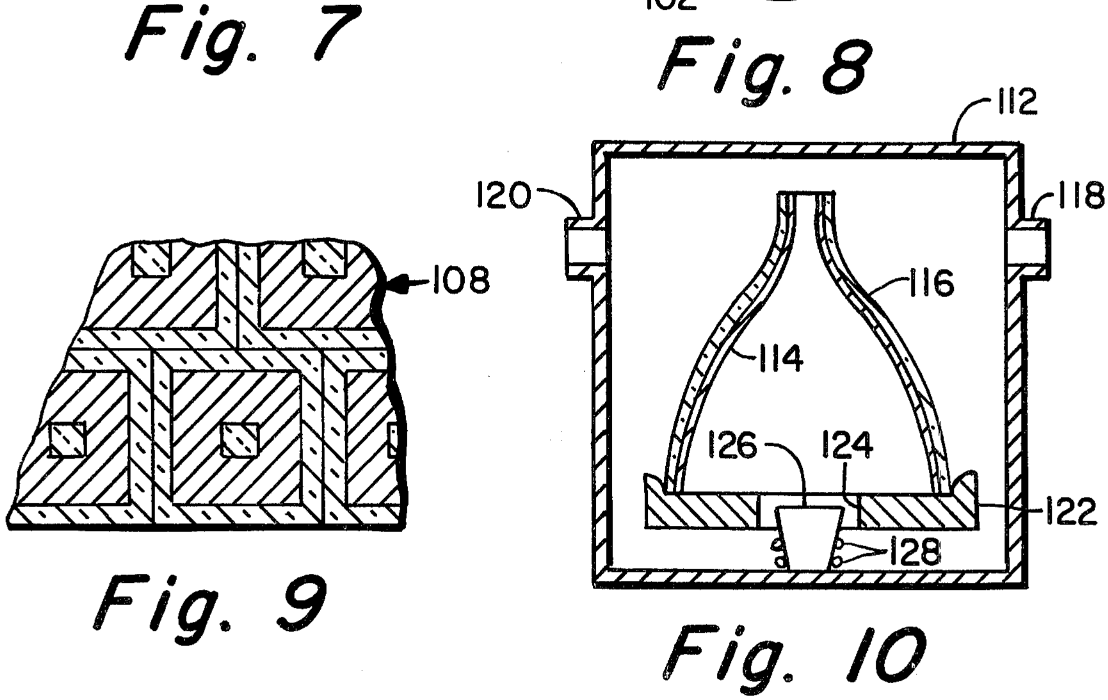
FIG. 10 illustrates an apparatus for forming a conductive coating in a cathode ray tube funnel.

The loosely stacked reacted fiber bundle 104 of FIG. 8 is then compacted by subjecting it to high temperatures and pressures in accordance with the teachings of the aforementioned Granitsas et al. patent to form the multilead array 108 illustrated in FIG. 9.

The method of the present invention is also useful for forming conductive coating on the inner surface of cathode ray tube funnel. FIG. 10 illustrates a simplified annealing lehr 112 which may be utilized in the formation of conductive coating 114 on the inner surface of funnel 116. Although lehr 112 could be evacuated, FIG. 10 illustrates an input port 118 for supplying an essentially oxygen-free atmosphere which may consist of an inert gas such as nitrogen, argon or the like or a reducing gas such as forming gas, hydrogen or the like. Exhaust gases are vented through outlet port 120. Funnel 116 is supported by a graphite platen 122 having an opening 124 therein in which is disposed a magnesium containing crucible 126 having auxiliary heating means such as resistance winding 128. Simplified lehr 112 is shown for the purpose of illustrating the present invention, and in practice, the annealing lehr may be large enough to accommodate a plurality of funnels, and a plurality of platens could be disposed on a moving belt to provide continuous operation.

A cathode ray tube funnel is usually heated in a lehr to a temperature of about 490°C. and slowly cooled to room temperature. For about 20 minutes the temperature of the funnel is above 400°C., and during that time, the auxiliary heater 128 is activated. Magnesium source 126 should be heated to a temperature between 600°C. and 1,000°C., depending upon the size of the magnesium source and the size of the funnel, thereby generating a large amount of magnesium vapor. A sufficient amount of vapor should be generated to create a very conductive coating, i.e., one having a resistivity of less than 1,000 ohms per square, within the 20 minute time interval that the temperature of the funnel is above 400°C. This process is advantageous in that it does not require additional manufacturing time since the funnel must be annealed, and the resulting coating adheres much more tenaciously to the funnel than the conventionally used graphite coating. Moreover, even thicker films could be formed by holding the temperature of the funnel above 400°C. for more than the usual 20 minute annealing period.

I claim:

1. A method of forming a conductive layer on a surface of an oxide-containing ceramic substrate comprising the steps of providing a substrate of oxide-containing ceramic material that is capable of being reduced by magnesium vapor at temperatures in excess of 300°C, said ceramic material being selected from the group consisting of sinterable ceramics, glasses and glass-ceramics, disposing said substrate in a reaction chamber having a vacuum system connected thereto for maintaining the pressure in said chamber at $10^{-4}$ Torr or less, heating said substrate to a temperature greater than 300°C but less than the deforming temperature thereof, and providing said chamber with a source of magnesium vapor that is disposed on that side of said substrate opposite said vacuum system connection so that said magnesium vapor flows across and reacts with a surface of said substrate, thereby reducing said surface and forming a conductive cermet thereon.

2. A method in accordance with claim 1 wherein the step of providing a substrate comprises providing a body consisting of glass, wherein the vapor pressure of magnesium in said chamber is at least one hundred times the oxygen pressure therein, and wherein said substrate is heated to at least 450°C.

3. A method in accordance with claim 1 wherein the step of providing said chamber with a source of magnesium vapor comprises disposing a source of metallic magnesium in said reaction chamber and heating said magnesium to at least 400°C.

4. A method in accordance with claim 1 wherein the step of providing said chamber with a source of magnesium vapor comprises providing a source of metallic magnesium remote from said reaction chamber, heating said magnesium to at least 400°C. to generate magnesium vapor, and flowing said magnesium vapor into said reaction chamber.

5. A method in accordance with claim 1 wherein the step of providing a substrate comprises providing a glass body having a plurality of parallel channels therethrough and the step of providing said chamber with a source of magnesium vapor comprises directing a flow of magnesium vapor into said channels, thereby reducing the channel forming surfaces of said body and forming a conductive cermet thereon.

6. A method in accordance with claim 1 wherein the step of providing a substrate comprises providing a glass body having a plurality of parallel apertures therethrough, and the step of providing said chamber with a source of magnesium vapor comprises directing a flow of magnesium vapor into said apertures.

7. A method in accordance with claim 1 wherein the step of providing comprises providing a substrate a plurality of rods of easily reduced glass, each of said rods being disposed within a tube of glass that is not as easily reduced as said glass rods, said tubes being disposed in side-by-side relation to form a stacked assembly, the step of heating comprises heating said assembly to a temperature sufficient to cause magnesium vapor to reduce the surfaces of said rods but insufficient to cause magnesium vapor to reduce the surfaces of said tubes, and the step of reacting comprises flowing magnesium vapor into said tubes to reduce the surfaces of said rods and form a conductive cermet thereon, said method further comprising the step of applying pressure to said assembly at an elevated temperature to cause said tubes to collapse upon said rods.

8. A method in accordance with claim 1 wherein the step of providing a substrate comprises providing a glass cathode ray tube funnel and the step of reacting comprises disposing a source of metallic magnesium adjacent to an opening in said funnel and heating said magnesium source to at least 600°C.

9. A method in accordance with claim 2 wherein the step of disposing comprises disposing said substrate in a reaction chamber having a vacuum system connected thereto for reducing the pressure in said chamber to $10^{-6}$ Torr or less.

10. A method in accordance with claim 3 wherein the temperature to which said magnesium is heated is different from the temperature to which said substrate is heated.

11. A method in accordance with claim 6 wherein the step of providing a glass body having a plurality of apertures therethrough comprises providing a stacked array of tubes of a first glass, each tube having disposed therein a rod of a second glass that is more easily reduced than said first glass, the cross-sectional shape of said rods and said tubes being different so that aperture forming spaces exist between said rods and said tubes, the step of heating comprises heating said stacked array to a temperature sufficient to cause said magnesium vapor to reduce the surfaces of said rods but insufficient to cause said magnesium vapor to reduce the surfaces of said tubes.

12. A method of forming a conductive layer on a surface of an oxide-containing ceramic substrate comprising the steps of providing an oxide-containing ceramic substrate consisting of a material that is capable of being reduced by magnesium vapor at temperatures in excess of 300°C, said ceramic material being selected from the group consisting of sinterable ceramics glasses and glass-ceramics, providing a reaction chamber having a vacuum system connected thereto for maintaining the pressure in said chamber at $10^{-4}$ Torr or less, providing said chamber with a source of magnesium vapor, disposing said substrate in said chamber between said source of magnesium vapor and the point of connection of said vacuum system so that magnesium vapor flows onto said substrate, and heating said substrate to a temperature greater than 300°C but less than the deforming temperature thereof.

13. A method in accordance with claim 12 further comprising the step of providing a baffle having an aperture therein, and disposing said baffle in said chamber between said source of magnesium vapor and said substrate to direct the flow of magnesium vapor onto said substrate.

14. A method in accordance with claim 12 wherein the step of providing said chamber with a source of magnesium vapor comprises disposing a source of metallic magnesium in said reaction chamber and heating said magnesium to at least 400°C., and said substrate is heated to at least 450°C.

15. A method in accordance with claim 13 wherein the step of providing a substrate comprises providing a hollow glass article and the step of disposing said substrate in said chamber comprises disposing said substrate on said baffle so that the hollow portion of said substrate is disposed over said aperture.

16. A method in accordance with claim 15 wherein the temperature to which said magnesium is heated is different from the temperature to which said substrate is heated.

* * * * *